(12) United States Patent
Shabbir et al.

(10) Patent No.: US 10,627,880 B2
(45) Date of Patent: Apr. 21, 2020

(54) SYSTEMS AND METHODS FOR FORWARD COMPATIBILITY OF CUSTOM THERMAL SETTINGS

(71) Applicant: Dell Products L.P., Round Rock, TX (US)

(72) Inventors: Hasnain Shabbir, Round Rock, TX (US); Dominick A. Lovicott, Jarrell, TX (US); Carlos Guillermo Henry, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 15/600,389

(22) Filed: May 19, 2017

(65) Prior Publication Data

US 2018/0335812 A1    Nov. 22, 2018

(51) Int. Cl.
| | | |
|---|---|---|
| *G06F 1/20* | (2006.01) | |
| *G06F 9/445* | (2018.01) | |
| *F24F 11/30* | (2018.01) | |
| *F24F 11/63* | (2018.01) | |
| *F24F 11/64* | (2018.01) | |
| *F24F 110/10* | (2018.01) | |
| *G06F 8/654* | (2018.01) | |
| *F24F 140/60* | (2018.01) | |

(52) U.S. Cl.
CPC ............ *G06F 1/206* (2013.01); *F24F 11/30* (2018.01); *F24F 11/63* (2018.01); *F24F 11/64* (2018.01); *F24F 2110/10* (2018.01); *F24F 2140/60* (2018.01); *G06F 8/654* (2018.02); *G06F 9/44505* (2013.01)

(58) Field of Classification Search
CPC ............... G06F 1/32; G06F 1/26; G06F 9/445
See application file for complete search history.

(56) References Cited

U.S. PATENT DOCUMENTS

| | | | |
|---|---|---|---|
| 9,667,263 B1* | 5/2017 | Chao | H03M 1/06 |
| 9,785,208 B2* | 10/2017 | Lovicott | |
| 2005/0149545 A1* | 7/2005 | Zenz | G06Q 10/06 |
| 2010/0117579 A1* | 5/2010 | Culbert | G06F 1/20 |
| | | | 318/471 |

(Continued)

*Primary Examiner* — Phil K Nguyen
(74) *Attorney, Agent, or Firm* — Jackson Walker L.L.P.

(57) ABSTRACT

When conflicting thermal parameters for thermal control exist in both of a personality module and one of a power table and a thermal table, wherein the power table comprises a plurality of entries each setting forth supported parameters for power management of one or more information handling resources, wherein the thermal table comprises a plurality of entries each setting forth parameters for thermal management of the one or more information handling resources, and wherein a personality module comprises a plurality of entries each setting forth custom parameters for system-specific power/thermal management of the one or more information handling resources, each entry of the personality module including an attribute associated with the custom parameters, a method may perform selecting one of the conflicting thermal parameters as a selected thermal parameter based on the at least one attribute; and writing an entry associated with the selected thermal parameter to final thermal.

13 Claims, 2 Drawing Sheets

(56) References Cited

U.S. PATENT DOCUMENTS

| | | | |
|---|---|---|---|
| 2013/0041852 A1* | 2/2013 | Ellis | G06Q 50/06 |
| | | | 705/412 |
| 2013/0258574 A1* | 10/2013 | Pamley | G06F 1/206 |
| | | | 361/679.31 |
| 2013/0275737 A1* | 10/2013 | Therien | G06F 9/445 |
| | | | 713/1 |
| 2014/0240089 A1* | 8/2014 | Chang | G07C 9/00111 |
| | | | 340/5.61 |
| 2015/0116106 A1* | 4/2015 | Fadell | G08B 19/005 |
| | | | 340/501 |
| 2016/0034009 A1* | 2/2016 | Wang | G06F 1/206 |
| | | | 713/300 |
| 2016/0091945 A1* | 3/2016 | Shabbir | G06F 1/3203 |
| | | | 713/300 |
| 2017/0255403 A1* | 9/2017 | Sharon | G06F 3/0619 |
| 2017/0344085 A1* | 11/2017 | Ragupathi | G06F 1/206 |

* cited by examiner

SYSTEMS AND METHODS FOR FORWARD COMPATIBILITY OF CUSTOM THERMAL SETTINGS

TECHNICAL FIELD

The present disclosure relates in general to information handling systems, and more particularly to systems and methods for providing power and thermal support of information handling resources in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

One challenge in the industry is providing power and thermal budget support of third-party information handling resources in an information handling system. In many instances, power and thermal budget support is provided to a handful of "approved" or "verified" information handling resources in power and thermal budget tables stored in a management controller or other information handling resource. However, once a version of management controller firmware is released, additions to the power or thermal budget tables to add support for another information handling resource (e.g., a Peripheral Component Interconnect-Extended or "PCIe" card) may require reconfiguration or recompilation of management controller firmware, which may delay shipment or release of an information handling system having power and thermal support for the information handling resource. In addition, any unsupported "off-the-shelf" information handling resources added by a customer after delivery may be assigned default parameters with respect to power and thermal budgeting rather than having customized parameters, which may lead to suboptimal performance.

In addition, in existing approaches, if a solution requires a customer thermal table, it is often provided in the form of a personality module that is embedded within the management controller and every time the management controller boots, it looks for the personality module information and loads it into memory. However, if subsequent firmware updates are made to the management controller, new thermal features associated with the firmware update may not be used, as the personality module information may override such updates.

SUMMARY

In accordance with the teachings of the present disclosure, the disadvantages and problems associated with maintaining forward compatibility of custom thermal settings in information handling systems may be substantially reduced or eliminated.

In accordance with embodiments of the present disclosure, an information handling system may include a processor, one or more information handling resources communicatively coupled to the processor and a management controller communicatively coupled to the processor. The management controller may have stored thereon: (i) at least one of a power table comprising a plurality of entries, each entry setting forth supported parameters for power management of the one or more information handling resources and a thermal table comprising a plurality of entries, each entry setting forth parameters for thermal management of the one or more information handling resources; (ii) a personality module comprising a plurality of entries, each entry setting forth custom parameters for system-specific power and thermal management of the one or more information handling resources, wherein each entry includes at least one attribute associated with the custom parameters; and (iii) a program of instructions configured to, if conflicting thermal parameters for thermal control exist in both of the personality module and one of the power table and the thermal table, select one of the conflicting thermal parameters as a selected thermal parameter based on the at least one attribute, and write an entry associated with the selected thermal parameter to final thermal settings of the management controller.

In accordance with these and other embodiments of the present disclosure, a method may include if conflicting thermal parameters for thermal control exist in both of a personality module and one of a power table and a thermal table, wherein the power table comprises a plurality of entries, each entry setting forth supported parameters for power management of one or more information handling resources, wherein the thermal table comprises a plurality of entries, each entry setting forth parameters for thermal management of the one or more information handling resources, and wherein a personality module comprises a plurality of entries, each entry setting forth custom parameters for system-specific power and thermal management of the one or more information handling resources, each entry of the personality module including at least one attribute associated with the custom parameters: (i) selecting one of the conflicting thermal parameters as a selected thermal parameter based on the at least one attribute; and (ii) writing an entry associated with the selected thermal parameter to final thermal settings of a management controller.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, if conflicting thermal parameters for thermal control exist in both of a personality module and one of a power table and a thermal table, wherein the power table comprises a plurality of entries, each entry setting forth supported parameters for power management of one or more information handling resources, wherein the thermal table comprises a plurality of entries, each entry setting forth parameters for thermal management of the one or more information handling resources, and wherein a personality module comprises a plurality of entries, each entry setting forth custom parameters for system-specific power and thermal management of the one or more information handling resources, each entry of the personality module including at least one attribute associated with the custom parameters: (i) select one of conflicting thermal parameters as a selected thermal parameter based on the at least one attribute; and (ii) write an entry associated with the selected thermal parameter to final thermal settings of a management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
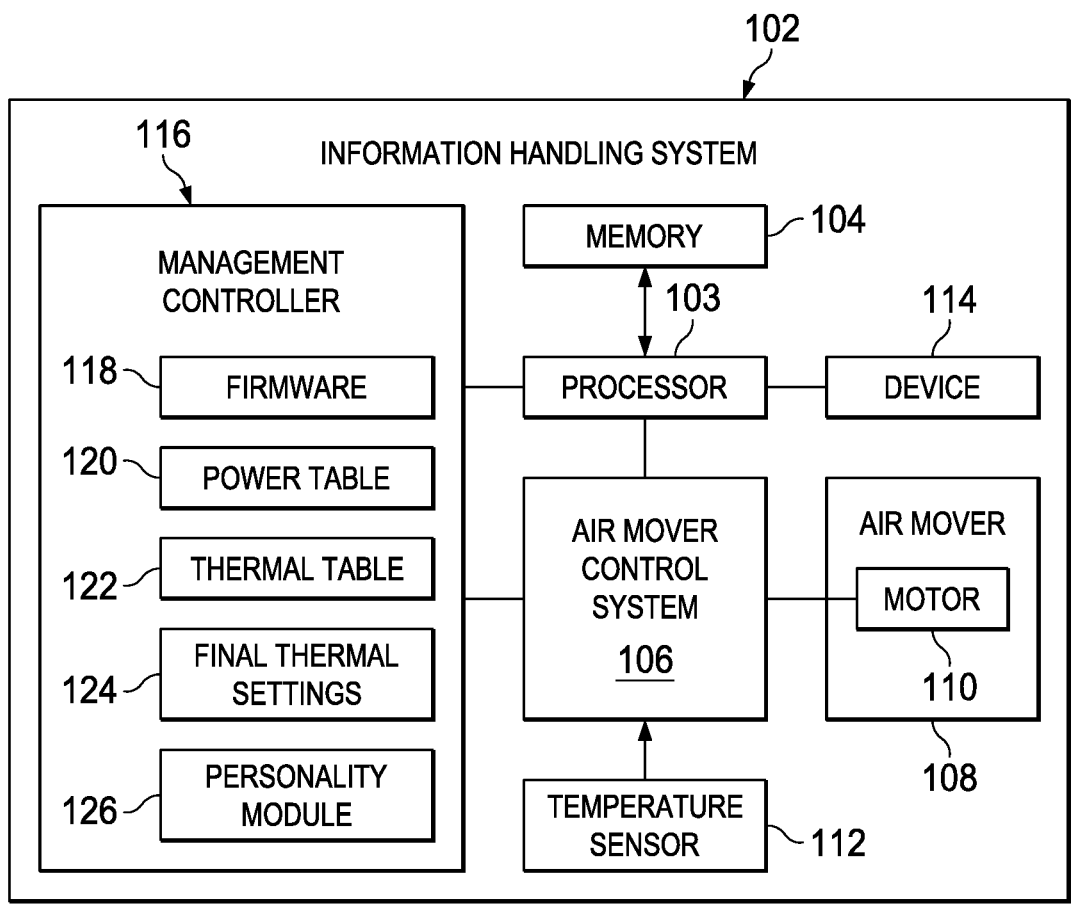
FIG. 1 illustrates a block diagram of an example information handling system, in accordance with the present disclosure.
Figure 2:
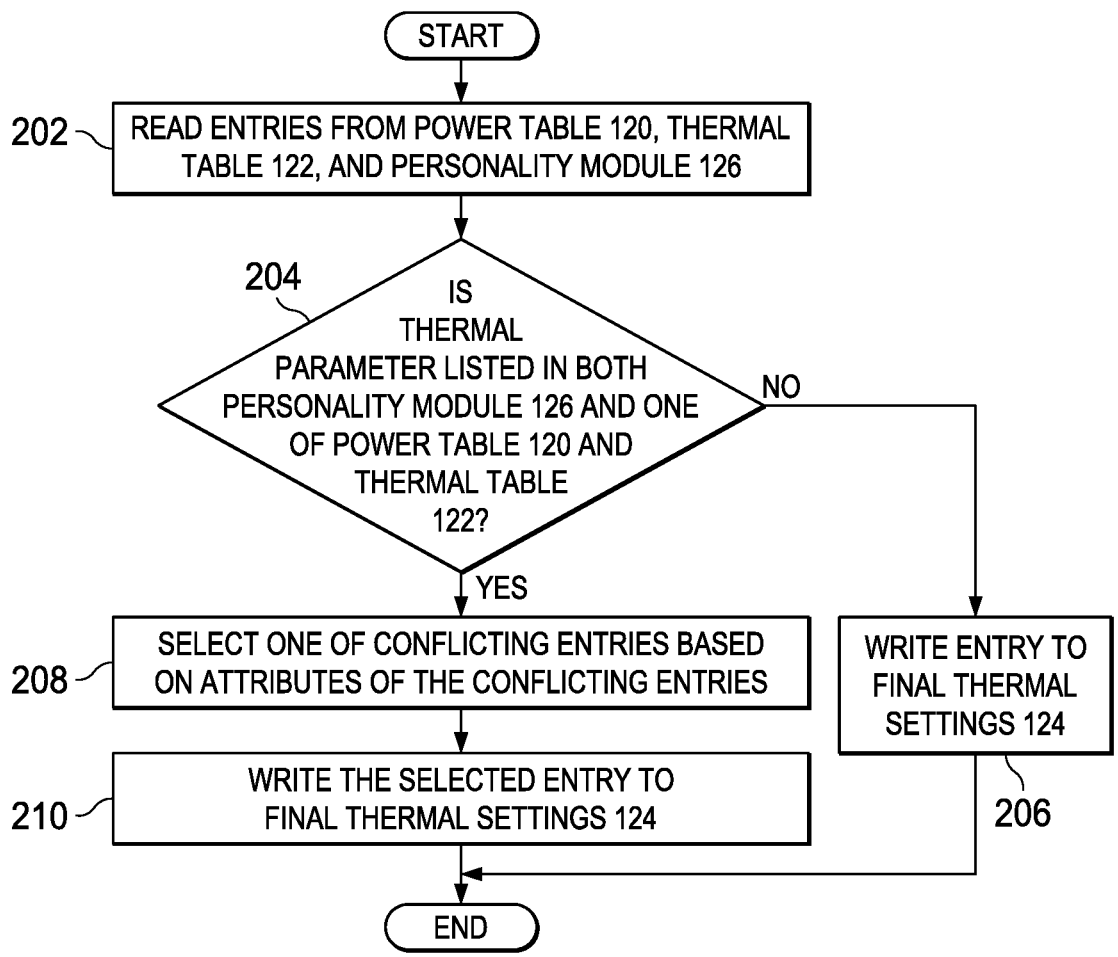
FIG. 2 illustrates a flow chart of an example method for providing forward compatibility of custom thermal settings with mainstream firmware releases, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104, an air mover control system 106, an air mover 108, a temperature sensor 112, one or more devices 114, and a management controller 116.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102. Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to information handling system 102 is turned off.

Air mover control system 106 may be communicatively coupled to processor 103 and may include any system, device, or apparatus configured to receive one or more signals indicative of one or more temperatures within information handling system 102 (e.g., one or more signals from one or more temperature sensors 112), receive information regarding thermal parameters of information handling resources (e.g., information from power and/or thermal tables of management controller 116) and based on such signals and thermal parameters, calculate an air mover driving signal to maintain an appropriate level of cooling, increase cooling, or decrease cooling, as appropriate, and communicate such air mover driving signal to air mover 108.

Air mover 108 may be communicatively coupled to air mover control system 106, and may include any mechanical or electro-mechanical system, apparatus, or device operable to move air and/or other gases. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by the air mover control signal communicated from air mover control system 106. In operation, air mover 108 may cool information handling resources of information handling system 102 by drawing cool air into an enclosure housing the information handling resources from outside the chassis, expelling warm air from inside the enclosure to the outside of such enclosure, and/or moving air across one or more heatsinks (not explicitly shown) internal to the enclosure to cool one or more information handling resources.

A temperature sensor 112 may be any system, device, or apparatus (e.g., a thermometer, thermistor, etc.) configured to communicate a signal to air mover control system 106 indicative of a temperature within information handling system 102.

For ease of exposition, FIG. 1 depicts only one each of air mover control system 106, air mover 108, and temperature sensor 112. However, it is noted that information handling system 102 may include two or more air movers 108 and each such air mover 108 may have a dedicated respective air mover control system 106. It is further noted that an air mover control system 106 may receive temperature signals from one or more temperature sensors 112, and that a single temperature sensor 112 may communicate temperature signals to one or more air mover control systems 106.

In addition to processor 103, memory 104, air mover control system 106, air mover 108, temperature sensor 112, device 114, and management controller 116, information handling system 102 may include one or more other information handling resources.

Device 114 may be communicatively coupled to processor 103 and may generally include any information handling resource. In some embodiments, device 114 may comprise a PCIe device. In these and other embodiments, device 114 may comprise an information handling resource that is not supported by power table 120 and/or thermal table 122 of management controller 116, but for which power and/or thermal information may be entered into an entry associated with device 114 into final thermal setting 124.

Management controller 116 may be configured to provide out-of-band management facilities for management of information handling system 102. Such management may be made by management controller 116 even if information handling system 102 is powered off or powered to a standby state. Management controller 116 may include a processor, memory, an out-of-band network interface separate from and physically isolated from an in-band network interface of information handling system 102, and/or other embedded information handling resources. In certain embodiments, management controller 116 may include or may be an integral part of a baseboard management controller (BMC) or a remote access controller (e.g., a Dell Remote Access Controller or Integrated Dell Remote Access Controller). In other embodiments, management controller 116 may include or may be an integral part of a chassis management controller (CMC).

As shown in FIG. 1, management controller 116 may include firmware 118, power table 120, thermal table 122, final thermal setting 124, and personality module 126. Firmware 118 may include a program of executable instructions configured to be read and executed by management controller 118 in order to carry out the functionality of management controller 118, including that functionality described herein.

Power table 120 may comprise a map, list, array, table, or other suitable data structure with one or more entries, each entry setting forth power parameters (e.g., peak power consumption, idle power consumption, etc.) regarding an information handling resource of information handling system 102. In particular, power table 120 may set forth power parameters for "known" or "supported" information handling resources that may be used in information handling system 102 and may be constructed and stored within a read-only memory of management controller 116 prior to runtime of information handling system 102 (e.g., during factory provisioning) that may only be updated in connection with periodic firmware updates to management controller 116.

Thermal table 122 may comprise a map, list, array, table, or other suitable data structure with one or more entries, each entry setting forth thermal parameters (e.g., target temperature, maximum temperature, etc.) regarding an information handling resource of information handling system 102. In particular, thermal table 122 may set forth thermal parameters for "known" or "supported" information handling resources that may be used in information handling system 102 and may be constructed and stored within a read-only memory of management controller 116 prior to runtime of information handling system 102 (e.g., during factory provisioning) that may only be updated in connection with periodic firmware updates to management controller 116.

Final thermal settings 124 may comprise a map, list, array, table, or other suitable data structure with one or more entries, each entry setting forth power parameters and thermal parameters regarding an information handling resource of information handling system 102. In particular, final thermal settings 124 may comprise or reside in a readable and writable memory of management controller 116 (e.g., non-volatile RAM) to allow for runtime creation of final thermal settings 124 (e.g., by firmware 118 or an executable program or script external to firmware 118) and addition of entries setting forth power and thermal parameters for information handling resources that may be used in information handling system 102. As described in greater details below, final thermal settings 124 may be constructed from power and thermal settings set forth in power table 120, thermal table 122, and personality module 126, based on attributes associated with the various power and thermal settings.

Personality module 126 may comprise a map, list, array, table, or other suitable data structure with one or more entries, each entry setting forth power parameters and/or thermal parameters regarding an information handling resource of information handling system 102. In existing approaches, if a custom solution requires a custom thermal table, such custom thermal table is provided in the form of a personality module 126 embedded within management controller 116. However, in such approaches, information in a personality module 126 may override power table 120 and thermal table 122, thus losing out on features supported by updates to power table 120 and/or thermal table 122.

To solve this disadvantage, each entry in power table 120, thermal table 122, and personality module 126 may include, in addition to the power and thermal control settings set forth in the entry, attributes regarding the criticality and upgradability of such entry. For example, each entry in power table 120, thermal table 122, and personality module 126 may include one or more attributes including a date attribute, an upgradability attribute, and a criticality attribute. A date attribute may simply set forth the date of the firmware release including such attribute or the date of the personality module including the attribute. An upgradability attribute may indicate whether a setting set forth in an entry of personality module 126 may be upgradable by a subsequent firmware release which updates an analogous setting set forth in an entry of power table 120 or thermal table 122. Thus, for example, a custom setting in an entry of personality module 126 may be assigned such that its setting may be upgraded in the future. Such upgradability would allow, as an example, for a thermal design team to define conservative cooling for a device 114, while allowing the thermal design team to adopt a more optimized cooling approach for the device 114 in a subsequent release.

A cooling criticality attribute may be an attribute that is indicative of an entry's criticality for providing adequate cooling. For example, a low criticality setting may be one that is used for power optimization, performance, or acoustics, while a high criticality setting may be one that if not satisfied, sacrifices reliability and/or safety of an information handling resource of information handling system 102.

In operation, based on the attributes for the various entries and the source of such entries (power table 120, thermal table 122, and personality module 126), firmware 118 (or an executable program, module, or script external to firmware 118) may arbitrate otherwise conflicting settings set forth in power table 120, thermal table 122, and personality module 126 and select settings to be used as final thermal settings 124. Thus, unlike previous approaches in which settings in personality module 126 would automatically override any conflicting settings in power table 120 or thermal table 122, in the present disclosure, a rules-based approach based on attributes of conflicting entries may determine which entry is used in final thermal settings 124. An example method illustrating this functionality of firmware 118 (or an executable program, module, or script external to firmware 118) is set forth below in reference to FIG. 2.

FIG. 2 illustrates a flow chart of an example method 200 for providing forward compatibility of custom thermal settings with mainstream firmware releases, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, a program of instructions (e.g., firmware 118 or an executable program, module, or script external to firmware 118), may read in the various entries from power table 120, thermal table 122, and personality module 126. At step 204, the program may determine whether, for each thermal parameter set forth in the entries, such thermal parameter is listed in an entry in both personality module 126 and one of power table 120 and thermal table 122. If such thermal parameter is listed in an entry in both personality module 126 and one of power table 120 and thermal table 122, method 200 may proceed to step 208. Otherwise, method 200 may proceed to step 206.

At step 206, responsive to determining that such thermal parameter is listed in an entry in only one of personality module 126, power table 120, and thermal table 122, the program may write the entry to final thermal settings 124. After completion of step 206, method 200 may end.

At step 208, responsive to determining that such thermal parameter is listed in an entry in both personality module 126 and one of power table 120 and thermal table 122, the program may compare attributes (e.g., date, upgradability, cooling criticality) of the conflicting entries to select which entry to write to final thermal settings 124. At step 210, the program may write the selected entry to final thermal settings 124. After the completion of step 210, method 200 may end.

Steps 204-210 may repeat for each thermal control parameter set forth in the entries of power table 120, thermal table 122, and personality module 126.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using management controller 116, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    a processor;
    one or more information handling resources communicatively coupled to the processor; and
    a management controller communicatively coupled to the processor, and having stored thereon:
        at least one of a power table comprising a plurality of entries, each entry setting forth supported parameters for power management of the one or more information handling resources and a thermal table comprising a plurality of entries, each entry setting forth parameters for thermal management of the one or more information handling resources;
        a personality module comprising a plurality of entries, each entry setting forth custom parameters for system-specific power and thermal management of the one or more information handling resources, wherein each entry includes at least one attribute associated with the custom parameters, wherein the at least one attribute includes a cooling criticality attribute indicative of an entry's criticality for providing adequate cooling, and wherein a high criticality corresponds to a safety and/or reliability requirement; and
        a program of instructions configured to, if conflicting thermal parameters for thermal control exist in both of the personality module and one of the power table and the thermal table, select one of the conflicting thermal parameters having a highest criticality among the respective criticalities of the conflicting thermal parameters as a selected thermal parameter, and write an entry associated with the selected thermal parameter to final thermal settings of the management controller.

2. The information handing system of claim 1, wherein the program of instructions comprises firmware for implementing functionality of the management controller.

3. The information handling system of claim 1, wherein the management controller is configured to control operation of the one or more information handling resources based on the entry associated with the selected thermal parameter written to the final thermal settings of the management controller.

4. The information handling system of claim 1, wherein the at least one attribute further includes an upgradability attribute indicating whether a setting set forth in the entry of the personality module may be upgradable by a subsequent firmware release which updates an analogous setting set forth in an entry of the power table or the thermal table.

5. The information handling system of claim 1, wherein each entry of the power table and the thermal table includes at least one attribute associated with supported parameters, and the program of instructions is further configured to select one of the conflicting thermal parameters as a selected thermal parameter based on the at least one attribute associated with the supported parameters and the at least one attribute associated with the custom parameters.

6. A method comprising:
    if conflicting thermal parameters for thermal control exist in both of a personality module and one of a power table and a thermal table, wherein the power table comprises a plurality of entries, each entry setting forth supported parameters for power management of one or more information handling resources, wherein the thermal table comprises a plurality of entries, each entry setting forth parameters for thermal management of the one or more information handling resources, and wherein a personality module comprises a plurality of entries, each entry setting forth custom parameters for system-specific power and thermal management of the one or more information handling resources, each entry of the personality module including at least one attribute associated with the custom parameters, wherein the at least one attribute includes a cooling criticality attribute indicative of an entry's criticality for providing adequate cooling, and wherein a high criticality corresponds to a safety and/or reliability requirement:
        selecting one of the conflicting thermal parameters having a highest criticality among the respective criticalities of the conflicting thermal parameters as a selected thermal parameter; and
        writing an entry associated with the selected thermal parameter to final thermal settings of a management controller.

7. The method of claim 6, further comprising controlling operation of the one or more information handling resources based on the entry associated with the selected thermal parameter written to the final thermal settings of the management controller.

8. The method of claim 6, wherein the at least one attribute further includes an upgradability attribute indicating whether a setting set forth in the entry of the personality module may be upgradable by a subsequent firmware release which updates an analogous setting set forth in an entry of the power table or the thermal table.

9. The method of claim 6, wherein each entry of the power table and the thermal includes at least one attribute associated with the supported parameters, and the method further includes selecting one of the conflicting thermal parameters as a selected thermal parameter based on the at least one attribute associated with supported parameters and the at least one attribute associated with the custom parameters.

10. An article of manufacture, comprising
    a non-transitory computer readable medium; and
    computer-executable instructions carried on the computer readable medium, the instructions readable by a processor, the instructions, when read and executed, for causing the processor to:
        if conflicting thermal parameters for thermal control exist in both of a personality module and one of a power table and a thermal table, wherein the power table comprises a plurality of entries, each entry setting forth supported parameters for power management of one or more information handling resources, wherein the thermal table comprises a plurality of entries, each entry setting forth parameters for thermal management of the one or more information handling resources, and wherein a personality module comprises a plurality of entries, each entry setting forth custom parameters for system-specific power and thermal management of the one or more information handling resources, each entry of the personality module including at least one attribute associated with the custom parameters, wherein the at least one attribute includes a cooling criticality attribute indicative of an entry's criticality for providing adequate cooling, and wherein a high criticality corresponds to a safety and/or reliability requirement:
  select one of conflicting thermal parameters having a highest criticality among the respective criticalities of the conflicting thermal parameters as a selected thermal parameter; and
  write an entry associated with the selected thermal parameter to final thermal settings of a management controller.

11. The article of claim 10, the instructions for further causing the processor to control operation of the one or more information handling resources based on the entry associated with the selected thermal parameter written to the final thermal settings of the management controller.

12. The article of claim 10, wherein the at least one attribute further includes an upgradability attribute indicating whether a setting set forth in the entry of the personal module may be upgradable by a subsequent firmware release which updates an analogous setting set forth in an entry of the power table or the thermal table.

13. The article of claim 10, wherein each entry of the power table and the thermal includes at least one attribute associated with supported parameters, and the instructions are further configured to select one of conflicting thermal parameters as a selected thermal parameter based on the at least one attribute associated with supported parameters and the at least one attribute associated with the custom parameters.

\* \* \* \* \*